(12) United States Patent
Krieger et al.

(10) Patent No.: US 7,523,806 B2
(45) Date of Patent: Apr. 28, 2009

(54) METHOD AND SYSTEM FOR IMPROVED ACTIVE DAMPING OF STEERING SYSTEMS

(75) Inventors: Geoff P. Krieger, Bay City, MI (US); Julie A. Kleinau, Bay City, MI (US); Kathryn L. Pattok, Frankenmuth, MI (US); Bertram Moeller, Nackenheim (DE)

(73) Assignee: Delphi Technologies, Inc, Troy, MI (US)

( * ) Notice: Subject to any disclaimer, the term of this patent is extended or adjusted under 35 U.S.C. 154(b) by 465 days.

(21) Appl. No.: 11/230,889

(22) Filed: Sep. 20, 2005

(65) Prior Publication Data
US 2007/0062755 A1    Mar. 22, 2007

(51) Int. Cl.
*B62D 5/04*    (2006.01)
*B62D 6/00*    (2006.01)

(52) U.S. Cl. .................. 180/446; 180/444; 180/443; 701/41; 701/42; 318/433; 318/434

(58) Field of Classification Search .................. 701/41, 701/42; 180/446, 444, 443; 318/433, 434
See application file for complete search history.

(56) References Cited

U.S. PATENT DOCUMENTS

| | | | | |
|---|---|---|---|---|
| 5,979,587 A * | 11/1999 | Liubakka et al. | ............ | 180/446 |
| 6,360,151 B1 * | 3/2002 | Suzuki et al. | .................. | 701/41 |
| 6,588,541 B2 * | 7/2003 | Norman et al. | ............. | 180/446 |
| 6,647,329 B2 | 11/2003 | Kleinau et al. | ................. | 701/41 |
| 6,658,335 B2 | 12/2003 | Kleinau et al. | ................. | 701/41 |
| 6,729,434 B2 * | 5/2004 | Stevens et al. | ............. | 180/446 |
| 6,838,846 B2 | 1/2005 | Matsuoka | ................... | 318/432 |
| 6,883,637 B2 * | 4/2005 | Nishizaki et al. | ............ | 180/446 |
| 7,100,735 B2 * | 9/2006 | Burton et al. | ................ | 180/446 |

* cited by examiner

*Primary Examiner*—Paul N Dickson
*Assistant Examiner*—Marlon A Arce
(74) *Attorney, Agent, or Firm*—Thomas N. Twomey

(57) ABSTRACT

A method for generating an active damping torque signal for a vehicle steering system includes receiving a vehicle speed input, receiving a handwheel velocity input, receiving a handwheel torque input, and generating an active damping torque output from each of the inputs, wherein the active damping torque output is non-linear with respect to the handwheel velocity input.

12 Claims, 4 Drawing Sheets

METHOD AND SYSTEM FOR IMPROVED ACTIVE DAMPING OF STEERING SYSTEMS

BACKGROUND

The present invention relates generally to vehicle steering systems and, more particularly, to a method and system for implementing improved active damping of vehicle steering systems.

In vehicles equipped with electric power steering (EPS) systems, a steering assist is provided (for example) by an electric motor coupled to the steering column or shaft. In order to provide a stable and precise feel for such steering systems, active input-dependent damping is typically provided. In particular, active damping systems (such as those presently implemented in EPS systems) utilize a vehicle speed dependent damping value that is multiplied by motor speed, and then scaled by a handwheel torque dependent scale factor in order to reduce the active damping torque at high handwheel torques. One example of such a system is described in U.S. Pat. No. 6,647,329 (assigned to the assignee of the present application), and which provides an input dependent damping component. This approach allows for adequate damping in a free control situation while also maintaining high assist levels during an aggressive driving maneuver.

In vehicles that have poorly damped chassis dynamics, large amounts of active damping correction are typically required of the EPS system. Using large amounts of active damping correction may create a "sticky" feeling on center. It has been recognized that while a large amount of damping may be required to provide stability in a large steering maneuver, as the handwheel (and vehicle) settles out and the handwheel velocity reduces, a smaller damping value may be used. An earlier implementation of this concept was achieved, not simply by introducing a damping term directly, but by scaling the back electromotive force (BEMF) voltage compensation term as a function of handwheel velocity to achieve the same effect. However, this initial approach made it difficult to intuitively tune in the vehicle, resulting in appropriate adjustments being made on a dynamometer. In another implementation of active damping, a direct scaling of a given damping value as a function of handwheel velocity (but not vehicle speed) was utilized. In other words, although the damping itself was a function of vehicle speed, the handwheel velocity dependent scaling was not vehicle speed dependent.

However, there still remains a need for providing an active damping system that obviates the need for a trade-off between damping performance and a sticky on-center feel, not only for EPS systems, but for other systems such as steer-by-wire, for example.

SUMMARY

The foregoing discussed drawbacks and deficiencies of the prior art are overcome or alleviated by a method for generating an active damping torque signal for a vehicle steering system. In an exemplary embodiment, the method includes receiving a vehicle speed input, receiving a handwheel velocity input, receiving a handwheel torque input, and generating an active damping torque output from each of the inputs, wherein the active damping torque output is non-linear with respect to the handwheel velocity input.

In another embodiment, a controller for generating an active damping torque signal for a vehicle steering system includes an algorithm configured for receiving a vehicle speed input, a handwheel velocity input, and a handwheel torque input. The algorithm is further configured to generate an active damping torque output from each of the inputs, wherein the active damping torque output is non-linear with respect to the handwheel velocity input.

In still another embodiment, a vehicle steering system includes a steering mechanism having a steering rack linked to a tie rod, a motor operably connected to the steering rack through a drive mechanism, and a controller in signal communication with the motor. The controller further includes an algorithm configured for receiving a vehicle speed input, a handwheel velocity input, and a handwheel torque input. The algorithm is further configured to generate an active damping torque output from each of the inputs, wherein the active damping torque output is non-linear with respect to the handwheel velocity input.

In still another embodiment, a storage medium includes a machine readable computer program code generating an active damping torque signal for vehicle steering systems, and instructions for causing a computer to implement a method. The method further includes receiving a vehicle speed input, receiving a handwheel velocity input, receiving a handwheel torque input, and generating an active damping torque output from each of the inputs, wherein the active damping torque output is non-linear with respect to the handwheel velocity input.

BRIEF DESCRIPTION OF THE DRAWINGS

Referring to the exemplary drawings wherein like elements are numbered alike in the several Figures.

DETAILED DESCRIPTION

Disclosed herein is a method and system for achieving improved active damping of vehicle steering systems. Briefly stated, a handwheel velocity dependent scaling function block is introduced into an EPS damping algorithm that generates an active damping torque command so as reduce a sticky on-center feel to an operator, without compromising overall damping performance. For example, the non-linear methodology discussed herein allows for smaller damping values to be used at low handwheel velocities while larger damping values may be used at larger handwheel velocities. Alternatively, it is also possible to provide large values of damping at low handwheel velocities where an operator desires a very damped free control behavior. In one exemplary embodiment, the specific manner in which the damping is scaled with handwheel velocity may further be a function of vehicle speed. In addition to electric power assist steering systems, it is also contemplated that the embodiments discussed herein are equally applicable to other types of steering systems such as, for example, steer-by-wire systems.

Figure 1:
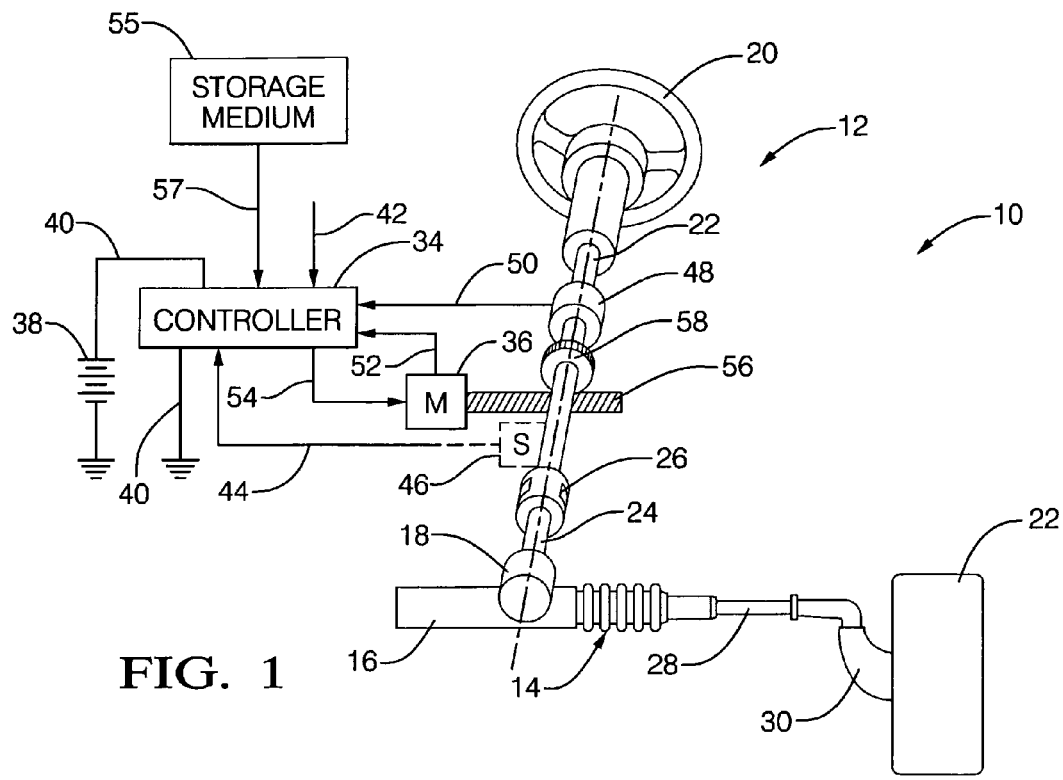
FIG. 1 is a schematic diagram of an exemplary electric power steering (EPS) system, suitable for use in connection with an embodiment of the invention.

Referring initially to FIG. 1, there is shown a schematic diagram of a motor vehicle 10 provided with an exemplary electric power steering (EPS) system 12. Again, it should be appreciated that the active damping methodology described hereinafter is equally applicable to other types of steering systems. The EPS system 12 may include a conventional rack and pinion steering mechanism 14, which includes a toothed rack 16 and a pinion gear (not shown) under a gear housing 18. As a steering input member (e.g., a steering wheel) 20 is turned, a steered member or upper steering shaft 22 turns a lower steering shaft 24 through a universal joint 26. In turn, the lower steering shaft 24 turns the pinion gear. The rotation of the pinion gear moves the rack 16, which then moves a pair of tie-rods 28 (only one shown) coupled to a pair of steering knuckles 30 (only one shown) to turn a pair of road wheels 32 (only one shown).

Electric power assist is provided through a controller 34 in conjunction with a power assist actuator, such as an electric motor 36. The controller 34 receives electric power from a vehicle electric power source 38 (e.g., a battery) through a line 40. Inputs to the controller 34 include a signal 42 representative of the vehicle velocity, as well as a signal 44 representative of steering pinion gear angle from a column or shaft rotational position sensor 46. As the steering wheel 20 is turned, a torque sensor 48 senses the torque applied to steering wheel 20 by the vehicle operator and provides an input steering torque signal 50 to controller 34. In addition, as the rotor of motor 36 turns, motor position signals 52 for each phase are generated within motor 36 and are provided to the controller 34.

In response to the vehicle velocity, operator torque, steering pinion gear angle and rotor position signals received, the controller 34 derives desired motor voltages and provides such voltages through a motor command signal 54 to motor 36. Instructions for deriving such outputs from the above described inputs may be stored within a suitable storage medium 55 in communication with the controller. Accordingly, the motor 36 supplies a torque assist to upper and lower steering shaft 22, 24, through a worm 56 and associated worm gear 58. If the torque sensor 48 is of the type that requires the upper steering shaft 22 to be separated at the sensor between upper and lower sections (allowing some range of rotational independence), both the rotational position sensor 44 and worm gear 58 are associated with the lower section of the steering shaft below torque sensor 48, as shown.

Figure 2:
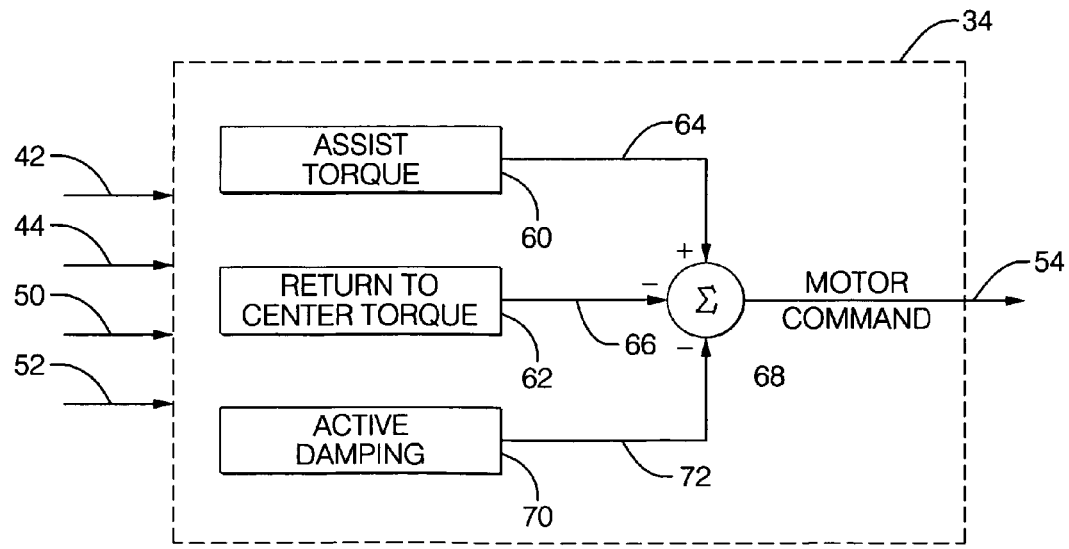
FIG. 2 is a high level block diagram of an EPS controller used in the system of FIG. 1.

Referring now to FIG. 2, there is shown a high level block diagram of the EPS controller 34 shown in FIG. 1. The inputs discussed above (e.g., vehicle speed 42, handwheel angle 44, handwheel torque 50 and EPS motor position 52) are used in computing the various torque components that ultimately determine the motor torque command 54. For example, a desired assist torque is derived at function block 60. The desired assist torque, in turn, determines a desired assist torque current that represents the amount of motor current to be commanded, specifically responsive to the inputs of input steering torque signal 50 and vehicle velocity signal 42. The desired assist torque current is outputted by block 60 through a command signal 64.

In addition, a desired return to center torque is derived at block 62. The desired return to center torque thus determines the magnitude of a return to center torque current, and is responsive to the vehicle velocity signal 42 and the handwheel angle signal 44. The desired return to center torque current is outputted by block 62 through a command signal 66. Signals 64 and 66 are inputted to summation block 68, wherein the magnitude of the return to center torque current command signal 66 is subtracted from the magnitude of the assist torque current command signal 64.

Thirdly, an active damping block 70 is also included within the controller 34, in order to determine an active damping torque current command signal 72. In a conventional active damping system (as described more fully below), the active damping torque current command signal 72 is derived from the handwheel angle signal 44 (used in turn to derive handwheel velocity), the vehicle velocity signal 42, and the handwheel torque signal 50. The resulting active damping torque current command signal 72 is then outputted to summation block 68, wherein the magnitude of the active damping torque current command signal 72 is subtracted from the difference between the assist torque current command signal 64 and the return to center torque current command signal 66. It will also be noted that the return to center torque block 62 may be omitted altogether, since the vehicle chassis characteristics themselves provide a return to center torque.

Figure 3:
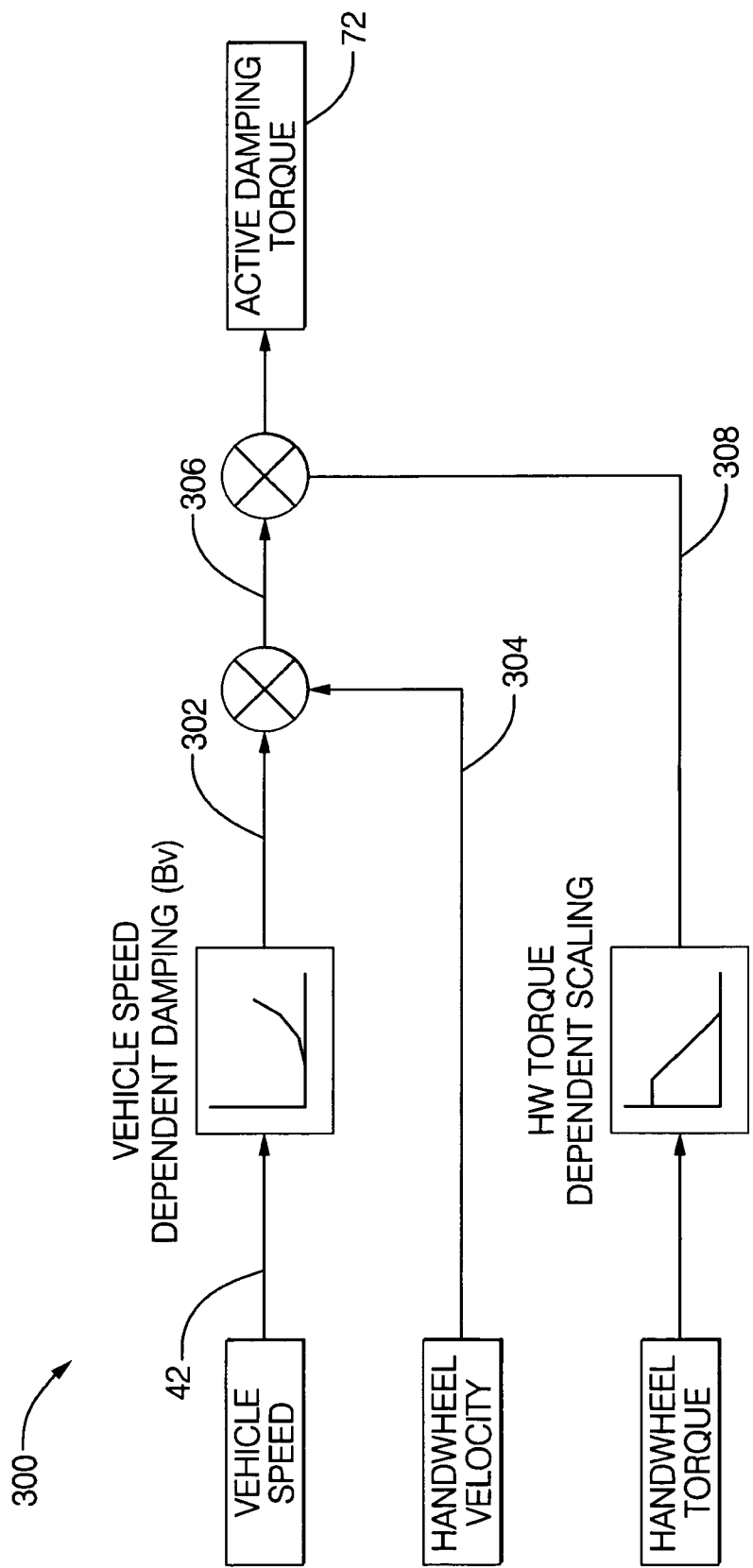
FIG. 3 is a block diagram of an existing algorithm for generating the active damping torque signal within the EPS controller of FIG. 2.

Referring now to FIG. 3, there is shown a block diagram of an existing algorithm 300 for generating the active damping torque signal 72 that, (as shown in FIG. 2) is used to oppose the overall torque command signal 54 of the EPS system 12 of FIG. 1. As is illustrated, the vehicle speed signal 42 is used to generate a vehicle speed dependent damping value 302 that is in turn multiplied by a handwheel velocity value 304 to create an intermediate damping torque signal 306. Again, the velocity may be obtained, for example, from the handwheel angle signal 44. This intermediate damping torque signal 306 is then scaled by a handwheel torque dependent scaling factor 308 configured to reduce the damping torque value at high handwheel torques. Thus, it will be seen that the resulting active damping torque signal 72 increases, for example, non-linearly with increasing vehicle speed and increases linearly with increasing handwheel velocity, and decreases linearly after a threshold handwheel torque is exceeded.

Alternatively, the conventional algorithm 300 of FIG. 3 may also be implemented so as to reverse the order of the two multiplication operations. In other words, the vehicle speed dependent damping value 302 is first multiplied by the handwheel torque dependent scaling factor 308, and thereafter multiplied by the handwheel velocity value 304. In either case, it will be seen that the overall active damping torque signal 72 is a linear function of the handwheel velocity.

Figure 4:
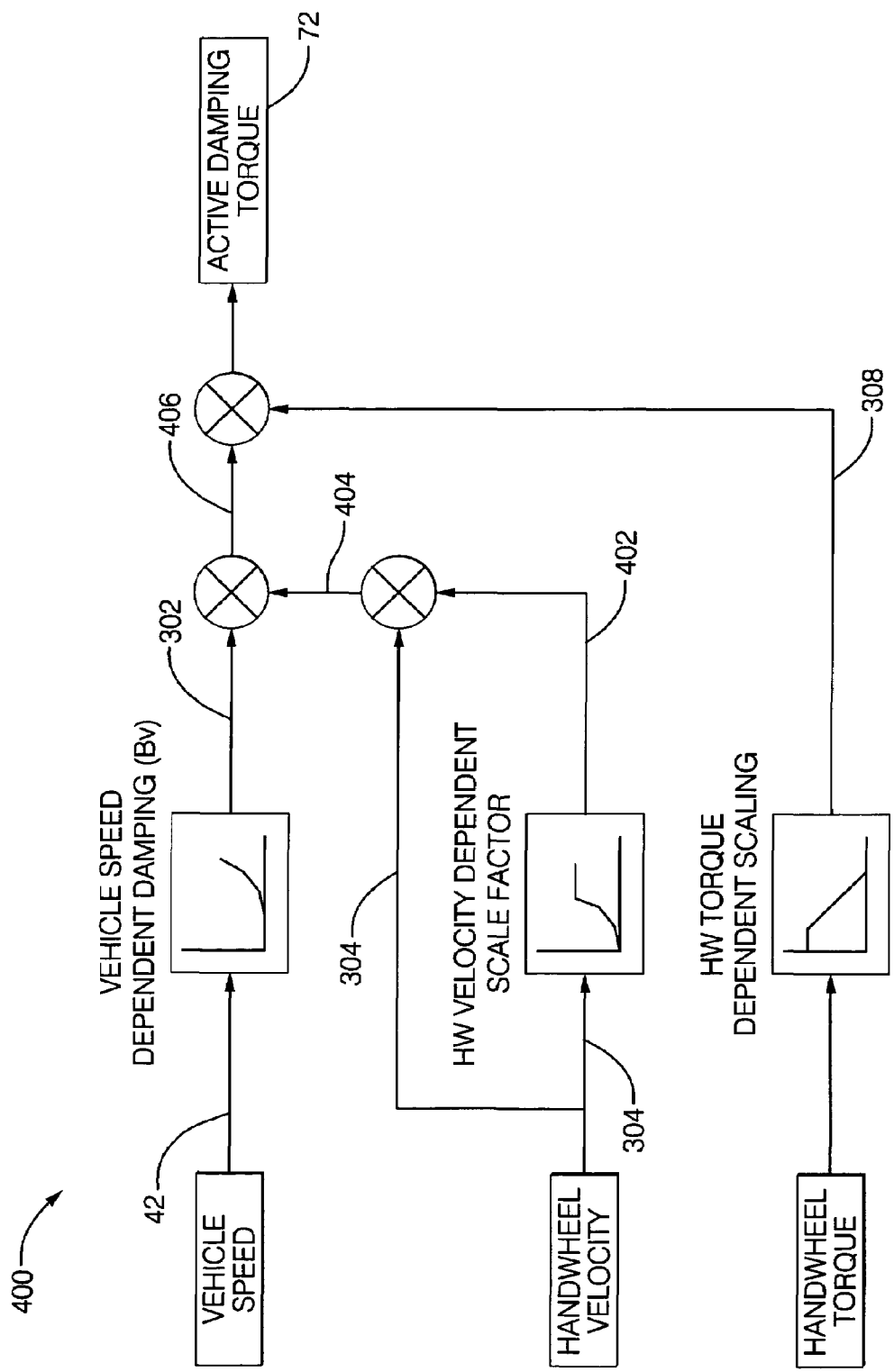
FIG. 4 is a block diagram of a method for generating an active damping torque signal, in accordance with an embodiment of the invention.

In contrast, FIG. 4 is a block diagram of a method 400 for generating an active damping torque signal, in accordance with an embodiment of the invention. As is shown, the method 400 incorporates a handwheel velocity dependent scaling factor 402 that is applied to the handwheel velocity value 304 before the scaled handwheel velocity value 404 is then multiplied by the vehicle speed dependent damping value 402. In an exemplary embodiment, the handwheel velocity dependent scaling factor 402 is a nonlinear function of the handwheel velocity value 304 and, more specifically is selected to be zero or near zero at zero motor velocity, and monotonically increasing as motor velocity increases. Although (in an exemplary embodiment) the scale factor can be truncated to unity at and above a specific handwheel velocity, it is also contemplated that the scale factor could also exceed unity (i.e., provide a multiplication factor for the handwheel velocity value 304) above a selected value. Moreover, the handwheel velocity dependent scaling factor 402 may also be increased (or decreased) with increasing motor velocity in a non-monotonic manner.

The handwheel velocity dependent scaling may be implemented through a function or lookup table, for example, or through any other suitable means. Mathematically speaking, the method 400 embodied by the block diagram in FIG. 4 is also equivalent to applying the handwheel velocity dependent scaling after the multiplication of the vehicle speed dependent damping value 302 with the motor velocity value 304. As such, the location of the scaling is a matter of convenience. In any event, following the nonlinear, handwheel velocity dependent scaling, the remainder of the implementation is the similar to that shown in FIG. 3; that is, an intermediate damping torque signal 406 is multiplied by the handwheel torque dependent scaling factor 308 to generate the active damping torque output 72.

Figure 5:
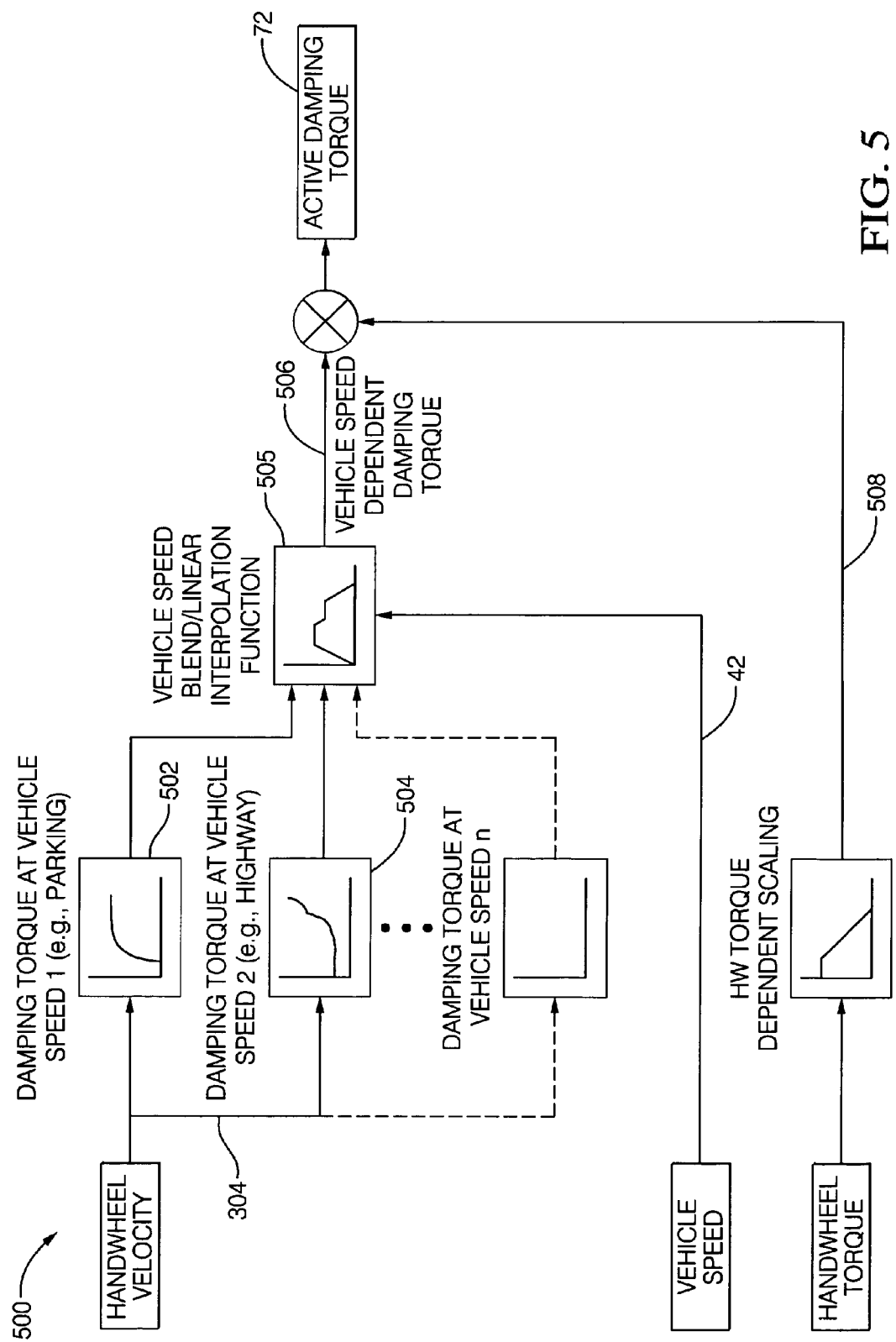
FIG. 5 is a block diagram of an alternative embodiment of the method of FIG. 4.

Finally, FIG. 5 is a block diagram of a method 500 for generating an active damping torque signal, in accordance with an alternative embodiment of the invention, in which a vehicle speed dependency is further added to the handwheel velocity dependent scaling. Whereas in the embodiment of FIG. 4, the handwheel velocity dependent scale factor applies for all vehicle speeds, the method 500 of FIG. 5 utilizes at least first damping torque versus handwheel speed curve 502 and at least a second damping torque versus handwheel speed curve 504. However, additional damping torque versus handwheel speed curves may also be used. In the example depicted, first curve 502 generates damping torque outputs as a function of handwheel speed at a first vehicle speed (e.g., parking), while second curve 504 generates damping torque outputs as a function of handwheel speed at a second vehicle speed (e.g., highway driving).

As further shown in FIG. 5, the outputs of each curve (502, 504) are blended together with a tunable function 505 of vehicle speed in order to generate the intermediate damping torque signal 506. However, where multiple (n) curves are used, the speed blend function 505 may be replaced by a linear interpolation function. In any case, the intermediate damping torque signal 506 may then be multiplied by the handwheel torque dependent scaling factor 508 to generate the active damping torque output 72. Since the handwheel (and vehicle) damping tuning requirements vary with vehicle speed, it is advantageous to adjust the on center tuning tradeoffs differently at the various vehicle speeds. However, regardless of whether vehicle speed is used as an additional variable in handwheel velocity dependent scaling, the tradeoff between adequate damping performance in the vehicle and a sticky feel on center is substantially reduced with handwheel velocity dependent scaling, as compared to the to the damping scheme of FIG. 3.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for generating an active damping torque signal for a vehicle steering system, the method comprising:
    receiving a vehicle speed input;
    receiving a handwheel velocity input;
    receiving a handwheel torque input; and
    generating an active damping torque output from each of said inputs, wherein said active damping torque output is non-linear with respect to said handwheel velocity input, and wherein said generating an active damping torque output further comprises:
    generating a vehicle speed dependent damping value from said vehicle speed input;
    generating a scaled handwheel velocity value using said handwheel velocity input and a nonlinear handwheel velocity dependent scale factor;
    multiplying said vehicle speed dependent damping value with said scaled handwheel velocity value to produce an intermediate damping torque signal;
    generating a handwheel dependent scaling factor from said handwheel torque input; and
    multiplying said intermediate damping torque signal with said handwheel dependent scaling factor to result in said active damping torque output.

2. The method of claim 1, wherein said handwheel velocity dependent scale factor is zero below a first handwheel velocity value and unity above a second handwheel velocity value.

3. A method for generating an active damping torque signal for a vehicle steering system, the method comprising:
    receiving a vehicle speed input;
    receiving a handwheel velocity input;
    receiving a handwheel torque input; and
    generating an active damping torque output from each of said inputs, wherein said active damping torque output is non-linear with respect to said handwheel velocity input, and wherein said generating an active damping torque output further comprises:
    generating at least a first damping torque value from said handwheel velocity value, based on a first vehicle speed;
    generating at least a second damping torque value from said handwheel velocity value, based on a second vehicle speed;
    blending said first and said second damping torque values, based on said vehicle speed input, to produce an intermediate damping torque signal;
    generating a handwheel dependent scaling factor from said handwheel torque input; and
    multiplying said intermediate damping torque signal with said handwheel dependent scaling factor to result in said active damping torque output.

4. The method of claim 3, wherein:
    said first damping torque value is determined from a first curve, said first curve comprising a nonlinear, damping torque versus handwheel velocity curve that is configured for said first vehicle speed; and
    said second damping torque value is determined from a second curve, said second curve comprising a nonlinear, damping torque versus handwheel velocity curve that is configured for said second vehicle speed.

5. A method for generating an active damping torque signal for a vehicle steering system, the method comprising:
receiving a vehicle speed input;
receiving a handwheel velocity input;
receiving a handwheel torque input; and
generating an active damping torque output from each of said inputs, wherein said active damping torque output is non-linear with respect to said handwheel velocity input, and wherein said generating an active damping torque output further comprises:
generating a plurality of damping torque values from said handwheel velocity value, based on a corresponding plurality of vehicle speeds;
linearly interpolating said plurality of damping torque values, based on said vehicle speed input, to produce an intermediate damping torque signal;
generating a handwheel dependent scaling factor from said handwheel torque input; and
multiplying said intermediate damping torque signal with said handwheel dependent scaling factor to result in said active damping torque output.

6. The method of claim 5, wherein said plurality of damping torque values is determined from a corresponding plurality of curves, each of which comprise a nonlinear, damping torque versus handwheel velocity curve that is specifically configured for a given one of said corresponding plurality of vehicle speeds.

7. A controller for generating an active damping torque signal for a vehicle steering system, comprising:
an algorithm configured for receiving a vehicle speed input, a handwheel velocity input, and a handwheel torque input;
said algorithm configured to generate an active damping torque output from each of said inputs, wherein said active damping torque output is non-linear with respect to said handwheel velocity input, and wherein said generating an active damping torque output flirt her comprises:
generating a vehicle speed dependent damping value from said vehicle speed input;
generating a scaled handwheel velocity value using said handwheel velocity input and a nonlinear handwheel velocity dependent scale factor;
multiplying said vehicle speed dependent damping value with said scaled handwheel velocity value to produce an intermediate damping torque signal;
generating a handwheel dependent scaling factor from said handwheel torque input; and
multiplying said intermediate damping torque signal with said handwheel dependent scaling factor to result in said active damping torque output.

8. The controller of claim 7, wherein said handwheel velocity dependent scale factor is zero below a first handwheel velocity value and unity above a second handwheel velocity value.

9. A controller for generating an active damping torque signal for a vehicle steering system, comprising:
an algorithm configured for receiving a vehicle speed input, a handwheel velocity input, and a handwheel torque input;
said algorithm configured to generate an active damping torque output from each of said inputs, wherein said active damping torque output is non-linear with respect to said handwheel velocity input, and wherein said generating an active damping torque output further comprises:
generating a first damping torque value from said handwheel velocity value, based on a first vehicle speed;
generating a second damping torque value from said handwheel velocity value, based on a second vehicle speed;
blending said first and said second damping torque values, based on said vehicle speed input, to produce an intermediate damping torque signal;
generating a handwheel dependent scaling factor from said handwheel torque input; and
multiplying said intermediate damping torque signal with said handwheel dependent scaling factor to result in said active damping torque output.

10. The controller of claim 9, wherein:
said first damping torque value is determined from a first curve, said first curve comprising a nonlinear, damping torque versus handwheel velocity curve that is configured for said first vehicle speed; and
said second damping torque value is determined from a second curve, said second curve comprising a nonlinear, damping torque versus handwheel velocity curve that is configured for said second vehicle speed.

11. A controller for generating an active damping torque signal for a vehicle steering system, comprising:
an algorithm configured for receiving a vehicle speed input, a handwheel velocity input, and a handwheel torque input;
said algorithm configured to generate an active damping torque output from each of said inputs, wherein said active damping torque output is non-linear with respect to said handwheel velocity input, and wherein said generating an active damping torque output flirt her comprises:
generating a plurality of damping torque values from said handwheel velocity value, based on a corresponding plurality of vehicle speeds;
linearly interpolating said plurality of damping torque values, based on said vehicle speed input, to produce an intermediate damping torque signal;
generating a handwheel dependent scaling factor from said handwheel torque input; and
multiplying said intermediate damping torque signal with said handwheel dependent scaling factor to result in said active damping torque output.

12. The controller of claim 11, wherein said plurality of damping torque values is determined from a corresponding plurality of curves, each of which comprise a nonlinear, damping torque versus handwheel velocity curve that is specifically configured for a given one of said corresponding plurality of vehicle speeds.

* * * * *